US006181809B1

(12) United States Patent
Primo et al.

(10) Patent No.: US 6,181,809 B1
(45) Date of Patent: *Jan. 30, 2001

(54) APPARATUS FOR PROCESSING AND DIGITIZING PHOTOGRAPHIC FILM IN ONE PASS

(75) Inventors: Henri August Primo, Lochristi (BE); Jürgen Müller, München (DE)

(73) Assignee: Agfa-Gevaert, N.V., Mortsel (BE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 203 days.

(21) Appl. No.: 08/580,389

(22) Filed: Dec. 28, 1995

Related U.S. Application Data

(63) Continuation of application No. 08/376,441, filed on Jan. 23, 1995, now abandoned, which is a continuation of application No. 07/989,364, filed on Dec. 11, 1992, now abandoned, which is a continuation-in-part of application No. 07/682,388, filed on Apr. 9, 1991, now abandoned.

(30) Foreign Application Priority Data

Apr. 19, 1990 (EP) .................................................. 90200969

(51) Int. Cl.[7] .................................................. G06K 9/00
(52) U.S. Cl. ........................ 382/128; 382/323; 396/570
(58) Field of Search ..................... 378/12, 176; 382/128, 382/132, 312, 321, 322, 323; 396/30, 570, 639

(56) References Cited

U.S. PATENT DOCUMENTS

| 3,066,589 | * | 12/1962 | Beatty .................................... 95/12.5 |
| 3,559,555 | * | 2/1971 | Street ........................................ 95/89 |
| 3,747,499 | * | 7/1973 | Foster .................................... 354/299 |
| 4,160,912 | * | 7/1979 | Hogan .................................... 250/468 |
| 4,442,453 | * | 4/1984 | Verdier .................................. 358/109 |
| 4,757,334 | * | 7/1988 | Volent ..................................... 354/76 |
| 4,803,737 | * | 2/1989 | Sato et al. .............................. 382/65 |
| 4,921,320 | * | 5/1990 | DeJager et al. ....................... 350/6.8 |
| 5,101,286 | * | 3/1992 | Patton ................................... 358/487 |
| 5,185,668 | * | 2/1993 | Ohta ....................................... 382/58 |
| 5,221,848 | * | 6/1993 | Milch ....................................... 382/6 |
| 5,235,183 | * | 8/1993 | Whiting et al. ....................... 250/236 |
| 5,237,358 | * | 8/1993 | Yamada et al. ...................... 354/298 |

* cited by examiner

Primary Examiner—Andrew W. Johns
(74) Attorney, Agent, or Firm—Breiner & Breiner

(57) ABSTRACT

An apparatus comprising means for processing exposed photographic film and means for digitizing the processed photographic film is disclosed. According to a preferred mode, the apparatus for processing exposed radiographic film and for digitizing the processed film on-line is characterized in that the digitizing section of the apparatus is connected directly to the dryer section and that the length of the digitizing section is not more than 10% of the total length of the processing section of the apparatus. The apparatus is particularly dedicated for the rapid processing and digitizing of medical radiographic film.

11 Claims, 3 Drawing Sheets

FIGURE:1

APPARATUS FOR PROCESSING AND DIGITIZING PHOTOGRAPHIC FILM IN ONE PASS

This is a continuation of application Ser. No. 08/376,441 filed on Jan. 23, 1995, now abandoned, which in turn is a continuation of application Ser. No. 07/989,364 filed on Dec. 11, 1992, now abandoned, which in turn is a continuation-in-part of application Ser. No. 07/682,388 filed on Apr. 9, 1991, now abandoned.

FIELD OF THE INVENTION

The present invention relates to an apparatus for processing and digitizing photographic film in one pass. In particular the invention relates to an apparatus for processing and digitizing medical X-ray film in one pass.

BACKGROUND OF THE INVENTION

The use of X-rays in medical diagnosis presently is widespread.

According to conventional techniques, an image is recorded by a radiographic film, squeezed between intensifying screens in a cassette. After exposure, the radiographic film is taken out of the cassette in a darkroom or the cassette is loaded in full daylight in a film handling and processing equipment such as the apparatus marketed by Agfa-Gevaert N. V., Belgium under the trade name CURIX CAPACITY PLUS, and the film is then processed in a photographic processor to yield the final radiographic image suited for medical diagnostic purposes.

Particulars of the overall radiographic process may be found in 'Medical X-Ray Technique, principles and applications' by G. J. Van der Plaats, Philips' Technical Library, 1959, 'Radiographic Processing in Medicine and industry' by D. H. O. John, The Focal Press, 1967, 'The Fundamentals of Radiography', publication by the Health Sciences Markets Division, Eastman Kodak Company, 1980, or numerous other publications in the field.

The conventional way of producing a radiographic image on film offers however some disadvantages, in particular in respect of archiving and retrieving the images.

Numerous radiological examining procedures already directly yield images suitable for diagnostic evaluation in digital form. Examples include digital subtraction angiography, magnetic resonance imaging, digital projection radiography using stimulable phosphor plates and computer tomography.

A general overview of e.g. the digital image radiographic system is set forth in the article from Minoru Gonoda et al, in "Radiology", September 1983, p. 833: "computed Radiography utilizing Scanning Laser Stimulated Luminescence".

However as long as radiographic techniques that yield directly images in digital form remain expensive, the classical filmradiography will keep its place within the diagnostic department of a hospital. On the other hand the need to have the radiographic image (diagnostic information and patient data) available in digitized form grows mainly for two reasons. First a digital image may be processed in any of the various ways offered by digital image processing apparatus, which enhances the diagnostic possibilities. Secondly such an image in digital form may enter into the digital information flow of the hospital.

It is thus of utmost importance that the conventionally produced films can be entered not only into the digital image processing environment but also into the digital information system of the hospital.

The technique for digitizing images is well known, e.g. U.S. Pat. No. 4,442,453 and many devices to perform digitization of film are commercially available.

Apparatus particularly dedicated for the digitization of radiographic images are commercially available under the trade names 'TRUSCAN' from Truvel Corp., 8943 Fullbright Avenue, Chatsworth, Calif. 91311, USA, '300A Computing Densitometer' from Molecular Dynamics, 240 Santa Ana Court, Sunnyvale, Calif. 94086, USA, 'Laser Scanner KFDR-S' from Konica Corp., Medical Products Marketing Division, Shinjuku Nomura Building No. 26-2, Nishishinjuku 1-chome, Shinjuku-ku, Tokyo 163, Japan, e.a.

Now the digitization of conventionally produced films proceeds as follows: the exposed and processed radiographic films are retrieved out of the archives, then they are placed on a film digitizing apparatus, the operating conditions of which are adjusted to take into account the particulars of the radiograph, such as format, desired resolution etc. and after digitization the digitized image is sent to a host computer by the digitizer, and the radiographic film is set again in the archives.

Working off-line, i.e. digitizing after the total processing, the first diagnosis and archival of the films, is a cumbersome and significantly labour-intensive procedure. A method for digitizing film during the processing has been proposed in U.S. Pat. No. 5,101,286 in connection with amateur and professional films.

In X-ray radiography the need for digitized images arises mainly in these hospitals that use a high volume of X-ray films. In advanced equiment for handling conventional X-ray film, e.g. the daylight filmhandling center marketed by Agfa-Gevaert N. V., Belgium under the trade name of CURIX CAPACITY PLUS, the access-time of the film is kept very low. The CURIX CAPACITY PLUS daylight filmhandling center in conjunction with the photographic processor marketed by Agfa-Gevaert N. V., Belgium under the trade mark CURIX HT 530 makes the image on film available for diagnosis within 1 minute. The transport speed of the film through the processor is accordingly high and is set in the range of 200 cm/min to 290 cm/min.

Although the need for digitizing is high in those high volume hospitals, the need for rapid access to the information is even higher. This means that a digitizer for use in an X-ray department on-line with a high capacity processing machine has to be so fast working as not to extend the access-time to the radiographic image.

In radiography the film-size that will be used depends largely on the examination at hand, in a typical radiography department the film-sizes used may vary from 5"×7" to 14"×17", and the digitizer has to accomodate all sizes.

SUMMARY OF THE INVENTION

It is an object of the invention to provide an apparatus for digitizing X-ray films on-line with the development machine without substantially extending the access-time to the film.

It is another object of the invention to provide an apparatus for digitizing X-ray film on-line with the development machine in which the digital resolution of the image is the same regardless the size of the film being digitized.

It is a further object of the invention to provide an apparatus for digitizing X-ray films on-line with the development machine in which the position of the film to the transport direction is changed and where the digitizer is provided with a separate driving mechanism.

DETAILED DESCRIPTION OF THE INVENTION

The above objects are accomplished by an apparatus for processing exposed radiographic film and for digitizing the processed film on-line characterized in that the digitizing section of the apparatus is connected directly to the dryer section and that the length of the digitizing section is not more than 10% of the total length of the processing section of the apparatus. In a particular embodiment the present invention provides an apparatus for processing exposed radiographic film and for digitizing the processed film on-line which comprises a X-ray film feed section (1), a developer tank (2), a fixer tank (3), a water tank (4), a heater and blower for drying the X-ray film in the drying section (5) and a digitizing section wherein after the processed film exits the drying section of the processor the position of the film is changed by 90 degrees with respect to the transport direction before entering the digitizing section.

The invention is described in detail below with reference to the drawings which illustrate specific embodiments.

Figure 1:
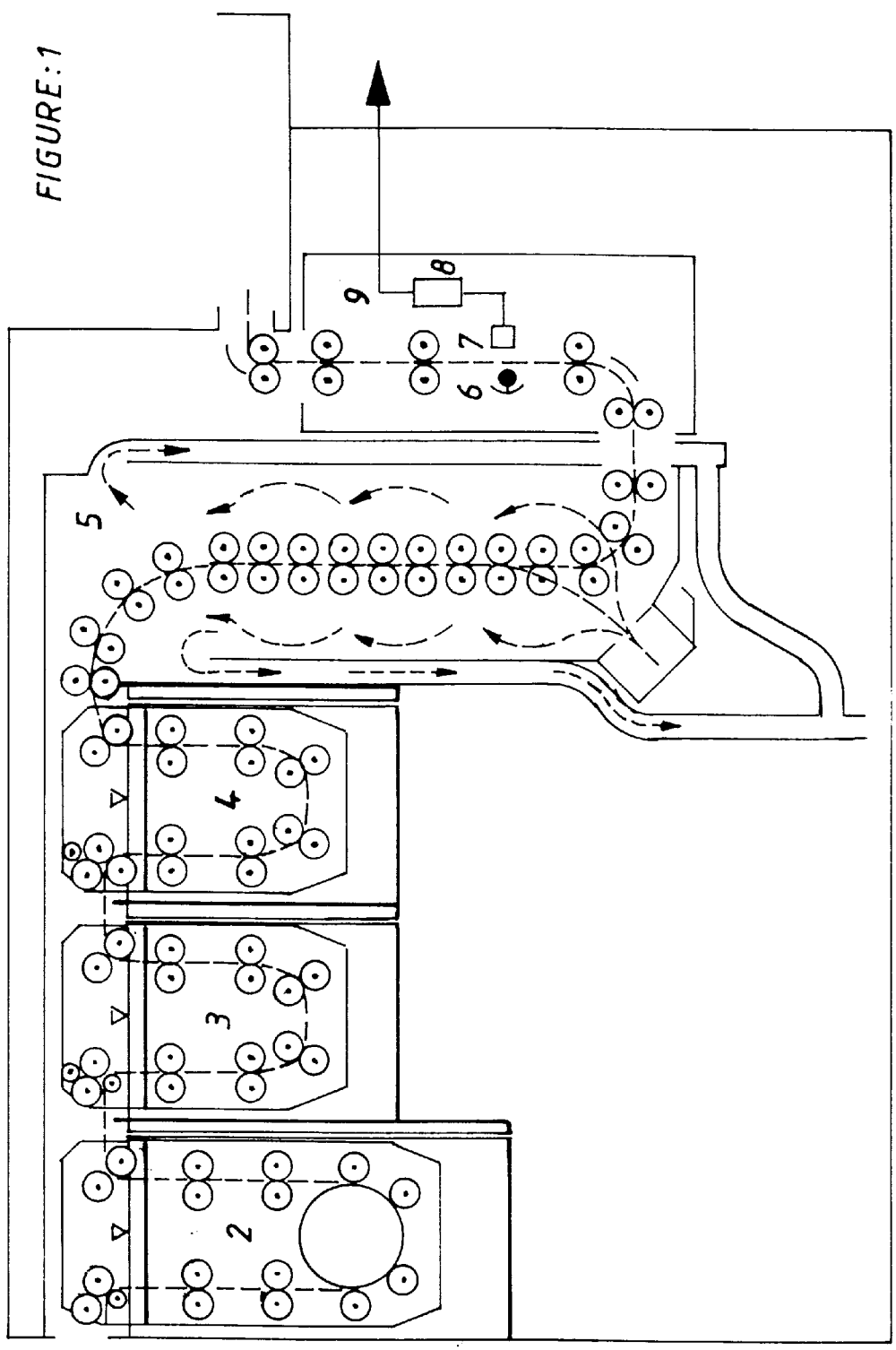
FIG. 1 illustrates a functional diagram of the apparatus according to the invention.

As may be seen in FIG. 1, the processing part of the apparatus of our invention comprises the following parts:
X-ray film Feed section(1)
Developer tank (2)
Fixer tank (3)
Water tank (4)
Heater and blower for drying the X-ray film in the dryer section (5)

The sections (1) to (5) in the apparatus are hereafter called "processing section".

The drive mechanism picks up the exposed photographic film at the entrance of the processing part of the apparatus of our invention, causing said film to be transported through the various sections of said part, further causing the processed photographic image to be further transported through the scanning-digitizing section of the apparatus to the exit of said apparatus.

The scanning-digitizing part of the apparatus according to the invention comprises the following means as illustrated in FIG. 1:
means for projecting scanning radiation towards the processed photographic film, (6)
means for sensing image-wise modulated radiation, (7)
means for converting the image-wise modulated radiation into a digitized signal, (8)
a digital signal storage (9) device to which said convertor means is connected and which is adapted to be connected to a signal processor (host-computer) and which may serve as a buffer memory between the scanner and said signal processor.

The scanning-digitizing part of the apparatus according to the present invention is restricted in its dimensions so as to make the plain film radiographic image and the digital form of it available to the diagnostician after virtually the same lapse of time as formerly the plain film radiographic image alone. The digitizer part of the apparatus is connected directly to the exit of the dryer section and adds not more than 10% to the distance over which the film is transported through the processing section. With a transport speed of 200 cm/min this adds maximally 3 sec to the total processing time.

The scanning of the processed film may be effected line-wise and can be performed in such a way that all pixels in each scanning line are irradiated simultaneously or one after another, e.g. using a laser beam. The former scanning method however is preferred for the implementation of the present invention.

For simultaneously irradiating the pixels of one line a plurality of radiation detectors (sensors) extending over the total width of the image to be scanned is required. The image-wise modulated radiation quanta can be directed by a set of mirrors and focused by a lens onto radiation sensitive sensors. As radiation source may be used one or more broad-spectrum fluorescent lamps, such as those used in the scanners marketed by Truvel Corporation, cited supra.

As radiation-sensitive sensors may be used e.g. metal oxide semiconductors (MOSs), photodiodes, phototransistors, charge coupled devices (CCDs) or a photomultiplier. The use of CCDs as light sensors is preferred, e.g. for scan areas not to exceed 12×17 inches, an array of 3600 cells×1 cell is preferably used.

So as to obtain a high resolution digitized image, the sensor senses the light level of each picture element, this detected analog signal is then processed and binarised by a conventional analog/digital converting means. Preferably the light intensity of each pixel image is converted into the precise level of gray within an overall 256 gray-level scale. Translation of the gray level of the radiograph in line art or in 4 or 16 gray scale levels is in principle also possible but results in a bitmap of substantially lower resolution, which is not preferred for the application of the present invention.

As the processed photographic film is passed between the radiation emitting head and the light sensors, the image-wise modulated light is captured by the sensors and converted by the converting means. The digitized image is stored in the internal memory buffer of the digitizer in bitmap form, or immediately transferred for further image processing and/or archival to a host computer.

The digitized image data are transmitted from the image digitizer to the host device via an interface bus. The digitizer is provided with an output port for the connection of a standardized interface bus so that the data output is in logical ACR-NEMA format, as described in ACR-NEMA Standards Publication no. 300 published by the National Electrical Manufacturers Association, 2101 L Street, N.W., Washington, D.C. 20037.

The digitizer can also be provided with an output port for the optional connection of a 50 pole connector with physical and logical ACR-NEMA compatibility as described in the ACR/NEMA standards Publiction cited above.

The apparatus of our invention offers the substantial advantage that the radiographic image produced in a conventional way on plain film are automatically digitized, immediately following their processing in one and the same pass and without any additional and cumbersome manipulation of the films. Moreover the image in digitized form is available together with the plain film radiographic image after essentially the same lapse of time as conventionally the plain film radiograph only.

Figure 2:
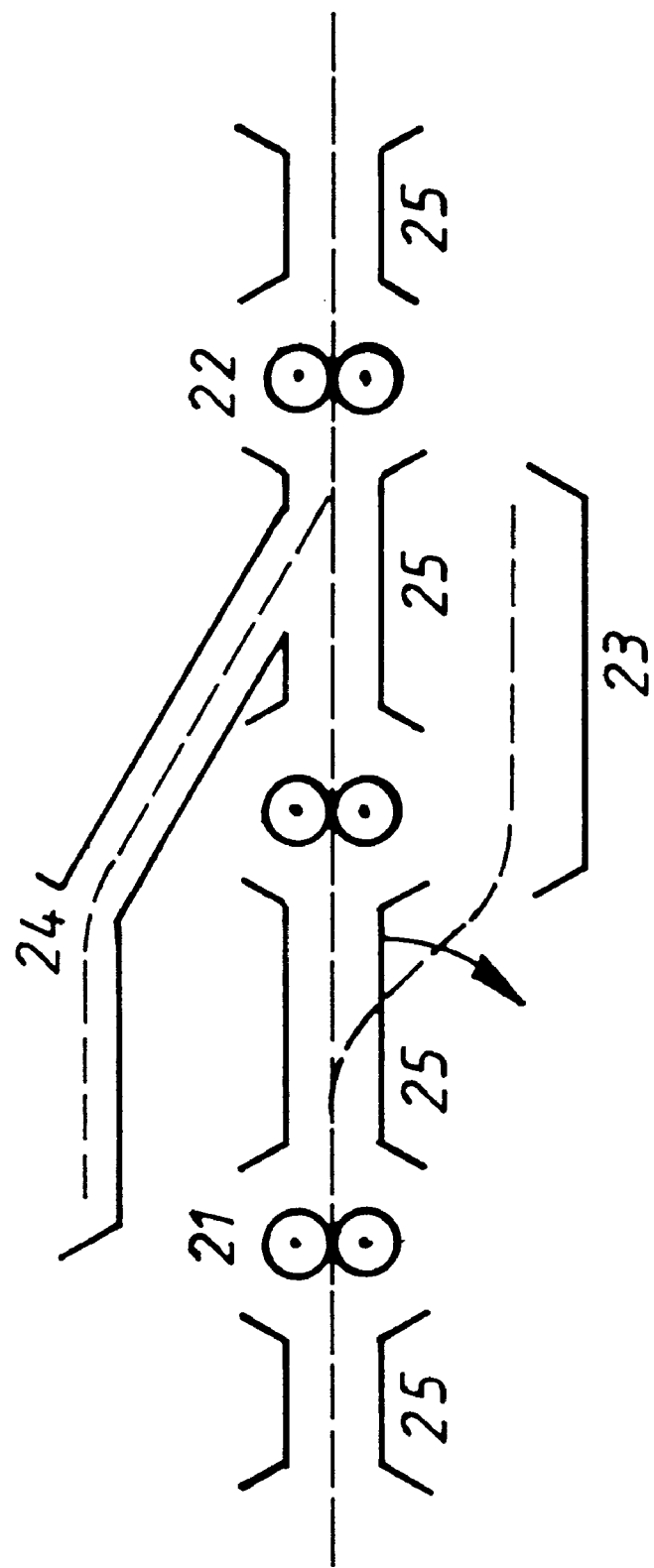
FIG. 2 illustrates functionally a bypass for inclusion in the apparatus of the present invention.

To provide for the use of the apparatus as a whole in circumstances where the extension of the processing time by 3 sec (41 sec instead of 38 sec) can be critical (e.g. in emergency rooms) the apparatus of the present invention may be equiped with an easy by-pass system which makes it possible to have the plain film image available for diagnosis before digitization takes place. In that case a flap is added just before the entrance of the scanning-digitizing part of the apparatus whereby the photographic film, after processing in the processing part of the apparatus, is lead to an intermediate exit tray. When needed the non-digitized film can be digitized after the diagnosis by entering it via the additional intermediate entrance in the digitizer. FIG. 2 represents a functional drawing of the above-described options wherein 21 indicates the last pair of rollers of the processing part of the apparatus of our invention, 22 indicates the first pair of rollers of the digitizing part of the apparatus of our invention, 23 indicates the optional intermediate exit tray, 24 indicates the optional intermediate entrance of the digitizing part of the apparatus of our invention, 25 indicates guide plates.

In order to combine the patient information and the diagnostically relevant information, that in conventional radiography are contained in the same sheet of film, the digitizing part of the apparatus is provided with an additional system enabling automatic patient information identification such as an OCR (Optical Character Recognition) module. By doing so the procedure of re-entering the patient information and linking same to the corresponding radiograph(s), is a duplication of efforts and also involves the risk of incorrectly linking radiographs and patient identification. Therefore according to a preferred mode of operation, the digitizer in the apparatus of our invention is provided with an OCR-system which automatically reads the patient information data on the radiograph to be digitized and links said info automatically to the digitized radiographic image.

Figure 3:
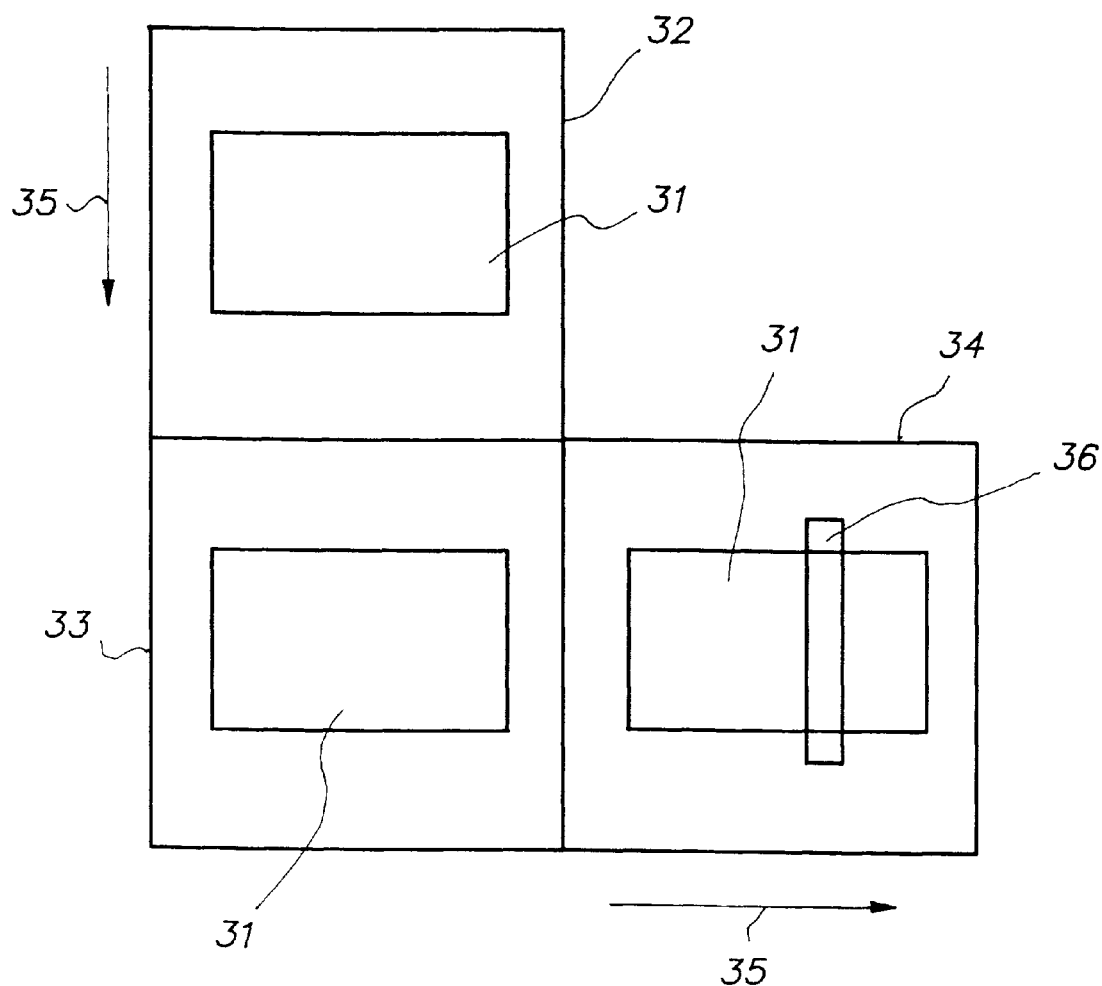
FIG. 3 illustrates functionally the combination of a film processing unit and a film digitizer in which the position of the film with respect to the transport direction is changed.

For some examinations the resolution of the image may be of more importance than the access-time to the films (e.g. in radiography of extremities, in mammography). In that case another design of the apparatus is proposed. After processing of the radiographic films which includes the steps of developing, fixing, rinsing and drying, in which the film proceeds trough the apparatus on its smaller side, the position of the film is changed by 90 degrees in respect to the transport direction before entering the digitizing section. In FIG. 3 the film (31) in the processing part of the apparatus (32) travels along its smallest side. In a buffer (33) the position of the film (31) is changed by 90 degrees with respect to the transport direction (35) and the film enters the digitizing part (34) along its longest side. In the digitizing part the information is line-wise scanned by a scanning means (36) perpendicular to the longest side of the film. This leads to a higher resolution in comparison to linewise scanning of the film perpendicular to the smallest side. In this embodiment of the invention, the film has to have completely left the dryer section of the processing section before it can enter the digitizing section and the digitizing can start. This means that the digitizing of the largest size (14"×17") can, in a 38 sec processing cycle, start after 48 sec and that the image on plain film and in digitized form are available for diagnosis 58 sec after entering the film in the processing section of the apparatus. This is still a substantially shorter time than the availability of the radiograph in conventional 90 sec cycle processing machines without digitizing part.

What is claimed is:

1. An apparatus for automatically processing, scanning, and digitizing an exposed X-ray film comprising
    (i) an automatic processing unit in which said exposed X-ray film is processed to form an analogous image on said film, and
    (ii) a scanning/digitizing unit in which said analogous image is scanned and digitized,
    (iii) means for transporting said exposed film through said processing unit and through said scanning/digitizing unit characterized in that said scanning/digitizing unit is connected to said processing unit in such a way that said processed film is fed directly from said processing unit into said scanning/digitizing unit.

2. An apparatus according to claim 1 wherein said exposed X-ray film is transported at a speed of at least 200 cm/min.

3. An apparatus according to claim 1 wherein between said processing unit and said scanning/digitizing unit a by-pass system is provided.

4. An apparatus according to claim 1 wherein said apparatus for automatically processing, scanning, and digitizing an exposed X-ray film comprises further a daylight film handling system.

5. An apparatus according to claim 1 wherein said scanning/digitizing unit comprises
    (i) means for projecting scanning radiation towards a processed X-ray film,
    (ii) means for sensing image-wise modulated radiation,
    (iii) means for converting said image-wise modulated radiation into a digital signal,
    (iv) a digital image storage device to which said means for converting image-wise modulated radiation is connected, and
    (v) a signal processor,
said digital image storage device being adapted to be connected to a signal processor and being capable of serving as a buffer memory between the apparatus for automatically processing, scanning, and digitizing an exposed X-ray film and said signal processor.

6. An apparatus according to claim 5 wherein said means for sensing image-wise modulated radiation is composed of a linear array of CCD-elements.

7. An apparatus according to claim 5 wherein said scanning/digitizing unit comprises further an Optical Character Recognition module.

8. An apparatus according to claim 5 wherein said exposed X-ray film having both an image and characters is processed in said processing unit and scanned/digitized in said scanning/digitizing unit, said characters being read by means of an Optical Character Recognition module and being sent as ASCII-data to an electronic image-archive.

9. An apparatus for automatically processing, scanning, and digitizing an exposed x-ray film comprising
    (i) an automatic processing unit in which said exposed x-ray film is processed to form an analogous image on said film, and
    (ii) a scanning/digitizing unit in which said analogous image is scanned and digitized,
    (iii) means for transporting said exposed film through said processing unit and through said scanning/digitizing unit wherein said processing unit comprises an x-ray film feed section, a developer tank, a water tank, a drying section, wherein said exposed film is transported from said feed section towards said drying section, wherein after said drying section a buffer is installed in which the direction of travel of said processing film is changed by 90 degrees before said exposed film enters said scanning/digitizing unit and wherein said processing unit and said scanning/digitizing unit are equipped with different means for transporting said exposed film and wherein said exposed film can be transported at a different speed in said processing unit and said scanning/digitizing unit.

10. A radiation image read-out apparatus comprising:

i) an automatic developing machine for carrying out a developing process on silver halide film, on which a radiation image has been recorded as a latent image, while said silver halide film is being passed through said automatic developing machine, and ii) a film digitizer, which is connected to said automatic developing machine such that it may directly receive said silver halide film having been fed out of said automatic developing machine, said film digitizer photoelectrically reading out said radiation image, which has been converted into a visible image during the developing process, from said silver halide film and thereby generating an image signal representing said radiation image.

11. An apparatus as defined in claim 10 wherein said film digitizer comprises a light source, which linearly irradiates light to said silver halide film having said visible image recorded thereon, and a line sensor located facing said light source with said silver halide film intervening therebetween, said line sensor detecting the light, which has been produced by said light source and has passed through said silver halide film.

\* \* \* \* \*